(12) United States Patent
Mita

(10) Patent No.: US 9,776,460 B2
(45) Date of Patent: Oct. 3, 2017

(54) PNEUMATIC TIRE WITH SPECIFIED BEAD CORE AND METHOD FOR MANUFACTURING THE SAME

(75) Inventor: Keiichi Mita, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 403 days.

(21) Appl. No.: 14/233,219

(22) PCT Filed: Jul. 24, 2012

(86) PCT No.: PCT/JP2012/004689
§ 371 (c)(1),
(2), (4) Date: Jan. 16, 2014

(87) PCT Pub. No.: WO2013/014919
PCT Pub. Date: Jan. 31, 2013

(65) Prior Publication Data
US 2014/0144567 A1    May 29, 2014

(30) Foreign Application Priority Data
Jul. 27, 2011    (JP) .................................. 2011-164722

(51) Int. Cl.
*B60C 15/04*    (2006.01)
*B29D 30/50*    (2006.01)

(52) U.S. Cl.
CPC .............. *B60C 15/04* (2013.01); *B29D 30/50* (2013.01); *B60C 2015/044* (2013.01); *Y10T 152/10819* (2015.01)

(58) Field of Classification Search
CPC ... B60C 15/04; B60C 2015/044; B29D 30/50; B29D 30/48; B29D 2030/486
(Continued)

(56) References Cited

U.S. PATENT DOCUMENTS 1,969,438 A * 8/1934 Warden .......................... 152/540
5,261,979 A   11/1993 Caretta
(Continued)

FOREIGN PATENT DOCUMENTS

CN    102009571 A    4/2011
EP    1162087 A1    12/2001
(Continued)

OTHER PUBLICATIONS

English machine translation of JP 2004-142478 A, May 20, 2004.*
(Continued)

*Primary Examiner* — Adrienne C Johnstone
(74) *Attorney, Agent, or Firm* — Sughrue Mion, PLLC

(57) ABSTRACT

Provided is a pneumatic tire having laminated reinforcement layers with organic fiber over a polygonal cross-section bead core, and in the layer, a rubber-coated organic fiber cord is tilted to the center line of the bead core in a transverse section and is spirally coiled, in which each organic fiber cord in an inner and outer adjacent reinforcement layers over the bead core extends such that an organic fiber cord in the inner reinforcement layer and an organic fiber cord in the outer reinforcement layer intersect each other relative to the center line of the bead core in the transverse section, in which in the inner reinforcement layer, the cord is coiled with space at least partially in a tire circumferential direction such that the cord does not overlap in the tire circumferential direction, and the outer reinforcement layer is arranged to cover at least a part of the space.

12 Claims, 7 Drawing Sheets

(58) Field of Classification Search
USPC .................. 152/540, 542; 156/460, 135, 136
See application file for complete search history.

(56) References Cited

U.S. PATENT DOCUMENTS 6,044,885 A * 4/2000 Kato ...................... B60C 15/04
152/540 X
2011/0056607 A1  3/2011 Yamazaki

FOREIGN PATENT DOCUMENTS

| JP | 2002-059716 A | 2/2002 |
| JP | 2004-142478 A | 5/2004 |
| JP | 2010-076570 A | 4/2010 |
| JP | 2011-051568 A | 3/2011 |

OTHER PUBLICATIONS

English machine translation of JP 2010-76570 A, Apr. 8, 2010.*
Communication dated Oct. 27, 2015 from the Japanese Patent Office issued in corresponding Japanese Application No. 2013-525580.
International Search Report for PCT/JP2012/004689, dated Oct. 30, 2012.
Extended European Search Report dated Mar. 5, 2015, issued by the European Patent Office in counterpart European application No. 12817654.2.
Communication dated May 12, 2015 from the Japanese Patent Office issued in corresponding Japanese application No. 2013525580.
Communication dated Jul. 20, 2015 from the State Intellectual Property Office of the People's Republic of China issued in corresponding Chinese application No. 201280035572.2.

* cited by examiner

FIG. 4
(a)
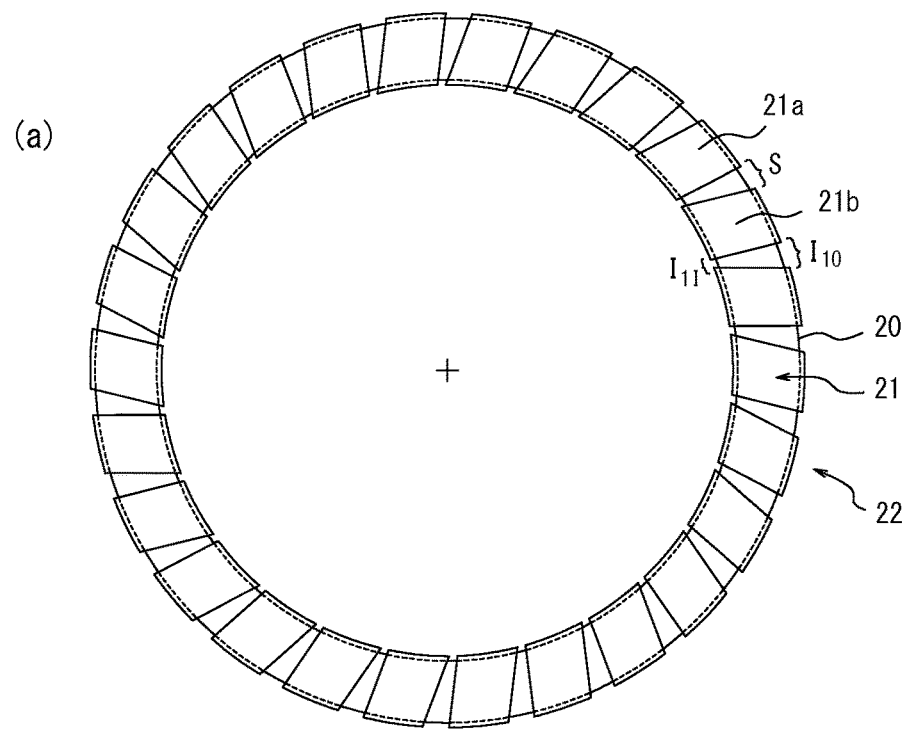
(b)
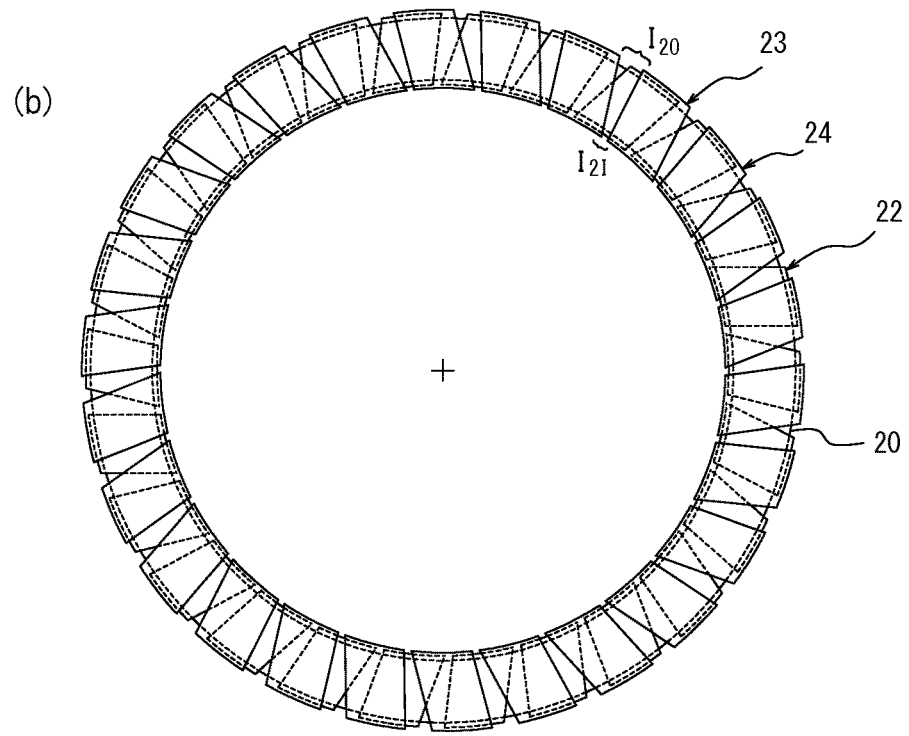

FIG. 6
(a)
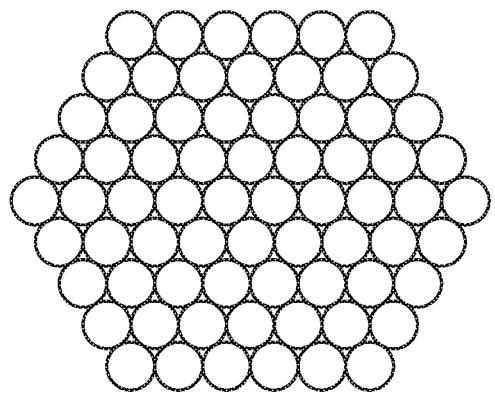
(b)
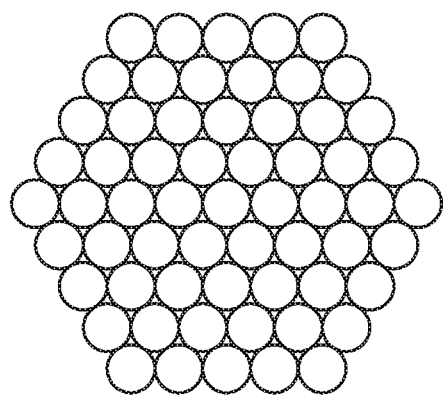
(c)
PRIOR ART
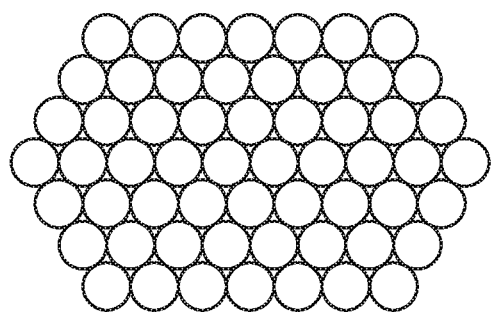

PNEUMATIC TIRE WITH SPECIFIED BEAD CORE AND METHOD FOR MANUFACTURING THE SAME

This is a National Stage of Application No. PCTJP2012/004689 filed Jul. 24, 2012, claiming priority based on Japanese Patent Application No. 2011-164722 filed Jul. 27, 2011.

TECHNICAL FIELD

The present invention relates to a pneumatic tire including: a pair of annular bead cores embedded and arranged in bead portions; a carcass formed of at least one carcass ply including a body and a folded portion connected to the body, the body toroidally extending between the pair of the bead cores, the folded portion folded around the bead core; and a tread rubber arranged on outer side of the periphery of a crown region of the carcass, in a cross section in a tire width direction, the bead core having a polygonal shape and the polygonal shape having at least one corner on the side of the body of the carcass ply. In particular, the present invention relates to a pneumatic tire preferably used as a heavy load tire for trucks or buses. The present invention also relates to a method for manufacturing the pneumatic tire. In particular, the present invention proposes a technique to reduce stress concentration at a carcass ply by the corner of the bead core and to prevent the degradation of durability of the carcass ply.

BACKGROUND ART

A pair of annular bead cores embedded and arranged in bead portions of a pneumatic tire holds a carcass ply, which includes a body and a folded portion connected to the body, in the bead portions and prevents a carcass ply from being drawn back from a bead portion against the action caused by an internal pressure of the filled tire or applied load to the tire. The body toroidally extends between the bead portions, and the folded portion is folded around the bead core.

The bead core is generally formed by coiling one or more steel cord or the like in a tire width direction and repeatedly coiling the cord in a tire radial direction such that given rows and given columns of the cords are arranged in a cross section in the tire width direction. In the cross section in a tire width direction, the bead core has a polygonal (e.g. a hexagonal) shape and includes at least one corner on the side of the body of the carcass ply.

The tire including the bead core having a polygonal shape cross section has a problem of durability of the carcass ply. That is, every time the tire rotates and is loaded and thus tension in such a direction that the carcass ply is drawn back is applied to the carcass ply, the body of the carcass ply is repeatedly pressed to the corner of the bead core on the side of the body. In particular, when the tire is used with unexpectedly high internal pressure or unexpectedly heavy load, press force to the corner of the bead core is increased to concentrate the stress of the carcass ply and thus the durability of the carcass ply is more degraded.

Patent Literature 1 discloses a pneumatic tire having a layer of rubber-coated and lined organic fiber cords sandwiched between a bead core and a carcass ply, the cords are tilted to a tire circumferential direction and coiled over the bead core. According to the tire, the distance between the body of the carcass ply and the corner of the bead core is secured with the organic fiber cord in the layer of organic fiber cords and coating rubber which coats the cords. The secured distance therebetween, in particular the thickness of the coating rubber, contributes to reduce the stress concentration at the carcass ply pressed by the corner of the bead core and to partially prevent degradation of durability of the carcass ply when the tire rotates and is loaded.

CITATION LIST

Patent Literature

PTL 1: JP2002059716A

SUMMARY OF INVENTION

Technical Problem

When manufacturing the above pneumatic tire disclosed in Patent Literature 1, material for the layer of the organic fiber cord is formed over the material for the bead core by spirally coiling a ribbon-shaped strip, in which an organic fiber cord is embedded, over the material for the bead core in a circumferential direction of the material for the bead core.

In this case, as illustrated in FIG. 7, which is side view of the material for the bead core made by coiling a strip, the strip 100 needs to be spirally coiled such that adjacent portions 100*a*, 100*b* of the strip do not overlap with each other in a circumferential direction of the material for the bead core in order to prevent deterioration of surface condition of the formed material for the layer with organic fiber. The deterioration is caused by overlapping of the adjacent portions of the ribbon-shaped strip coiled in the circumferential direction of the material for the bead core, in particular, caused by overlapping of an internal cord extending in parallel in the strip.

However, if the strip 100 is coiled in a way described above, due to the difference between inner circumferential length and outer circumferential length of the material 101 for the bead core, the regions not covered with the strip are formed on the circumferential surface of material 101 for the bead core, and a number of spaces 102 are formed in the material for the layer with organic fiber cord. Accordingly, in the above tire having just one layer with organic fiber cord, there exists a number of portions around and in a circumferential direction of the bead core where the thickness of rubber is thin. As a result, risk of the degradation of durability of the carcass ply still cannot be sufficiently avoided.

To address the above problem of conventional arts, it is an object of the present invention to provide a pneumatic tire that reduces stress concentration at a carcass ply pressed by the corner of the bead core and thus sufficiently prevents degradation of durability of the carcass ply. It is also an object of the present invention to provide a method for manufacturing the pneumatic tire.

Solution to Problem

A pneumatic tire according to the present invention includes: a pair of annular bead cores embedded and arranged in bead portions; a carcass formed of at least one carcass ply including a body and a folded portion connected to the body, the body toroidally extending between the pair of the bead cores, the folded portion folded around the bead core; a tread rubber arranged on outer side of the periphery of a crown region of the carcass; and at least two laminated reinforcement layers with organic fiber over the bead core, and in the layer, one or more rubber-coated organic fiber cord is tilted to the center line of the bead core in a transverse section and is spirally coiled, in which in a cross section in a tire width direction, the bead core has a polygonal shape and includes at least one corner on the side of the body of the carcass ply, in which each organic fiber cord in an inner adjacent reinforcement layer with organic fiber and in an outer adjacent reinforcement layer with organic fiber over the bead core extends such that an organic fiber cord in the inner reinforcement layer with organic fiber and an organic fiber cord in the outer reinforcement layer with organic fiber intersect each other relative to the center line of the bead core in the transverse section, in which in the inner reinforcement layer with organic fiber of the adjacent reinforcement layers with organic fiber, the rubber-coated organic fiber cord is coiled with space at least partially in a tire circumferential direction such that the rubber-coated organic fiber cord does not overlap in the tire circumferential direction, and the outer reinforcement layer with organic fiber is arranged to cover at least a part of the space.

It is noted that "the center line of the bead core in a transverse section" represents an annular line extending through the center of the bead core in a section in a width direction of the bead core and extending in the circumferential direction of the bead core.

In this pneumatic tire, the distance between the body of the carcass ply and the corner of the bead core on the side of the body in the tire width direction is preferably equal to or more than 2 millimeters and equal to or less than 3 millimeters when the tire is mounted onto the conformable rim and inflated to a predetermined internal pressure.

The term "the conformable rim" represents a rim prescribed by the following standard in accordance with size of a tire, and the term "predetermined internal pressure" represents air pressure corresponding to the maximum loading capacity and prescribed by the following standard, and the term "maximum loading capacity" represents a maximum loading which is allowed to load the tire in the following standard.

The "standard" represents an industrial standard which is valid in a region where a tire is manufactured or used. Examples of the standard include "YEAR BOOK" of the Tire and Rim Association Inc. in the United States, "STANDARDS MANUAL" of the European Tyre and Rim Technical Organization in Europe, and "JATMA YEAR BOOK" of Japan Automobile Tyre Manufacturers Association in Japan.

It is noted that when a bead core is formed by coiling one or more steel cord or the like in a tire width direction and repeatedly coiling in a tire radial direction to pile the cord in columns, the distance between the body of the carcass ply and the corner of the bead core represents the shortest distance between surface of the cord of the bead core, the cord located on the corner on the side of the body, and surface of the ply cord of the carcass ply in the tire width direction.

In this pneumatic tire, in the section in the tire width direction, the ratio of the length of the bead core in a tire radial direction to the length of the bead core in the tire width direction is preferably between 1:0.8 and 1:1.2.

In addition, with respect to a method for manufacturing a pneumatic tire according to the present invention, during forming two or more layers of material for reinforcement layers with organic fiber over annular material for a bead core, the method including the steps of: arranging a ribbon-shaped strip, which is made by coating an organic fiber cord with unvulcanized rubber, over the material for the bead core such that the ribbon-shaped strip is tilted to the center line of the material for the bead core in a transverse section; spirally coiling the ribbon-shaped strip such that adjacent portions of the strip do not overlap with each other in a circumferential direction of the material for the bead core to form material for an inner reinforcement layer; and spirally coiling a ribbon-shaped strip over the material for the inner reinforcement layer and over space between the adjacent portions of the strip of the inner reinforcement layer to form material for an outer reinforcement layer such that the strip of the material for the outer reinforcement layer intersect with the strip of the material for the inner reinforcement layer.

Advantageous Effect of Invention

According to the pneumatic tire of the present invention, at least two laminated reinforcement layers with organic fiber over a bead core is provided, and each organic fiber cord in an inner adjacent reinforcement layer with organic fiber and an outer adjacent reinforcement layer with organic fiber extend such that an organic fiber cord in an inner reinforcement layer and an organic fiber cord in an outer reinforcement layer intersect each other relative to the center line of the bead core in the transverse section, entire circumferential surface of the bead core is covered with two or more reinforcement layers with organic fiber, the layer having large thickness. Accordingly, the pneumatic tire may effectively reduce stress concentration at the carcass ply caused by being pressed into the corner of the bead core when the tire rotates and is loaded, and as a result, the pneumatic tire may sufficiently prevent risk of degradation of durability of the carcass ply.

In addition, since in the inner reinforcement layer with organic fiber of the adjacent reinforcement layers with organic fiber, the rubber-coated organic fiber cord is coiled with space at least partially in a tire circumferential direction such that the rubber-coated organic fiber cord does not overlap in the tire circumferential direction, overlapping of the organic fiber cord included in the inner reinforcement layer with organic fiber may be prevented and thus local large force applied from the bead core to the carcass ply may be prevented.

And since the outer reinforcement layer with organic fiber is arranged to cover at least a part of the space, thickness of rubber layer over entire circumferential surface of the bead core may be secured.

When the distance between the body of the carcass ply and the corner of the bead core on the side of the body is equal to or more than 2 millimeters and equal to or less than 3 millimeters, given thickness of the reinforcement layers with organic fiber between the bead core and the carcass ply is secured to reduce the stress concentration at the carcass ply while the bead core effectively achieves a function to hold the carcass ply to prevent the drawing back of the carcass ply from the bead portion. In addition, thermal degradation of rubber caused by increasing amount of heat generation in the bead portion may be prevented.

In other words, when the distance between the body of the carcass ply and the corner of the bead core is less than 2 millimeters, the stress concentration at carcass ply could not be sufficiently reduced since the distance from the corner of the bead core to the body of the carcass ply is short. On the other hand, when the distance is more than 3 millimeters, holding force on the carcass ply by the bead core could decrease, and increase of volume of rubber could lead to increase of the amount of heat generation in the bead portion.

When the ratio of the length of the bead core in a tire radial direction to the length of the bead core in the tire width direction is between 1:0.8 and 1:1.2, since in the section of the tire in the tire width direction, the bead core having hexagonal shape for example becomes vertically longer and open angle of the corner of the bead core on the side of the body of the carcass ply becomes larger than that of a bead core of a conventional tire, the stress concentration at the carcass ply pressed by the corner may be more reduced when the tire rotates and is loaded and thus degradation of durability of the carcass ply may be more effectively prevented.

In other words, when the ratio of the length of the bead core in a tire radial direction to the length of the bead core in the tire width direction exceeds 1.2, the effect to reduce stress concentration at the carcass ply by increasing the open angle of the corner of the bead core on the side of the body of the carcass ply cannot be sufficiently achieved. On the other hand, when the ratio of the bead core is less than 0.8, rigidity of the bead portion could decrease and degrade steering stability.

In addition, according to the method for manufacturing a pneumatic tire of the present invention, when a ribbon-shaped strip is spirally coiled over material for a bead core to form of material for a reinforcement layer with organic fiber and to form space of the material for the first reinforcement layer between the adjacent portions of the strip in a circumferential direction of the material for the bead core, material for outer reinforcement layer on the material for the first reinforcement can cover the space.

Therefore, a tire which may efficiently reduce stress concentration at a carcass ply can be manufactured since in the manufactured tire, two or more reinforcement layers with organic fiber over the bead core enables entire circumferential surface of the bead core to be coated with sufficiently thick rubber.

It is noted that according to the method, since during forming the material for the outer reinforcement layer, the ribbon-shaped strip is coiled in such a direction that the strip of material for the outer reinforcement layer intersect with the strip of material for the inner reinforcement layer, an organic fiber cord embedded in material for the inner reinforcement layer and an organic fiber cord embedded in material for the outer reinforcement layer do not overlap in parallel to prevent deterioration of surface condition of material for the reinforcement layer, the deterioration caused by parallel overlapping of organic fiber cords. Accordingly, forming an unintended concavo-convex shape of the surface of the carcass ply may be prevented, the unintended concavo-convex shape caused by areas where organic fiber cords overlap being pressed by the carcass ply.

BRIEF DESCRIPTION OF DRAWINGS

FIG. 4 is a side view of material for a bead core over which a strip is coiled, showing a part of manufacturing process of a tire of FIG. 1;

FIG. 6 is a cross-sectional view in a tire width direction, showing each of bead cores arranged in Example Tires and Conventional Tires.

DESCRIPTION OF EMBODIMENTS

The embodiment according to the present invention will be described below with reference to the accompanying drawings.

Figure 1:
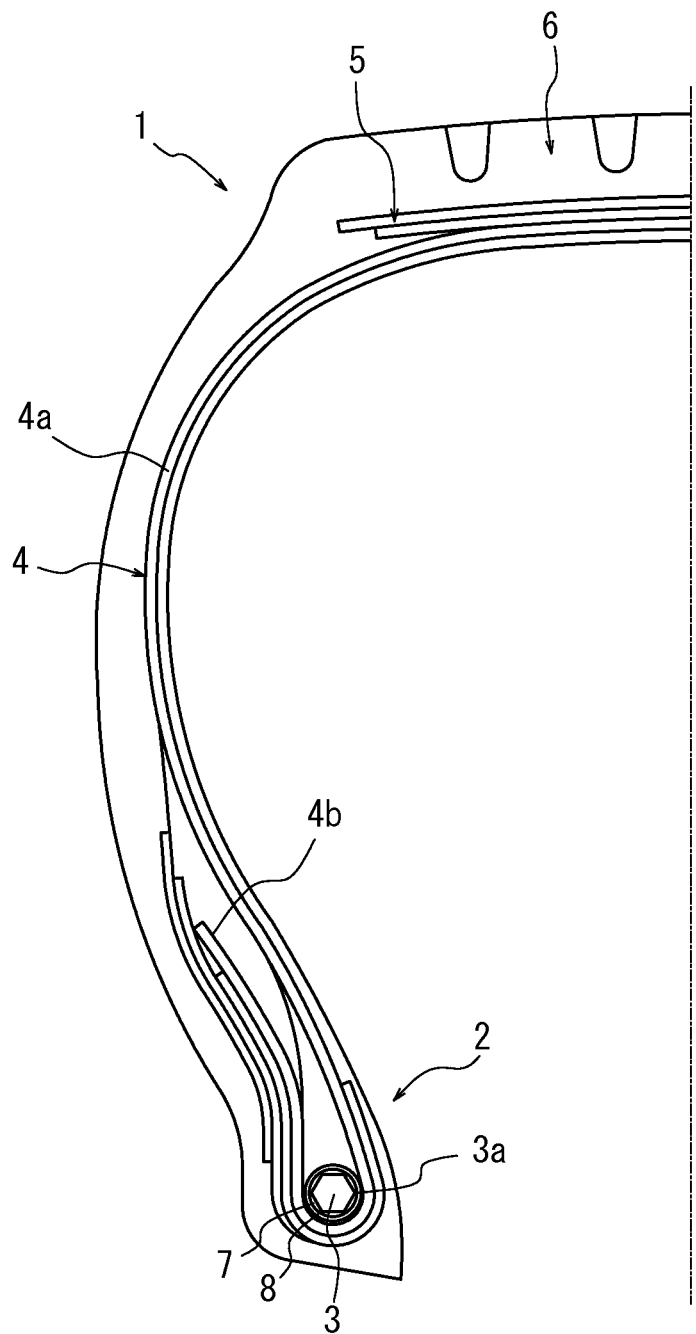
FIG. 1 is a cross-sectional view in a tire width direction of a pneumatic tire according to one embodiment of the present invention, showing half of the pneumatic tire.

FIG. 1 illustrates an exemplary heavy load pneumatic tire 1 including: a pair of annular bead cores 3 embedded and arranged in bead portions 2; a carcass ply 4 including a body 4a and a folded portion 4b connected to the body 4a, the body 4a is toroidally extending between the pair of the bead cores 3, in the embodiment, the folded portion 4b outwardly folded around the bead core 3 in a tire width direction; a belt 5 having two belt layers for example and arranged on outer side of the periphery of a crown region of the carcass ply 4; and a tread rubber 6 arranged on outer side of the periphery of the belt 5. The tire has a bead diameter of at least 20 inches.

Figure 2:
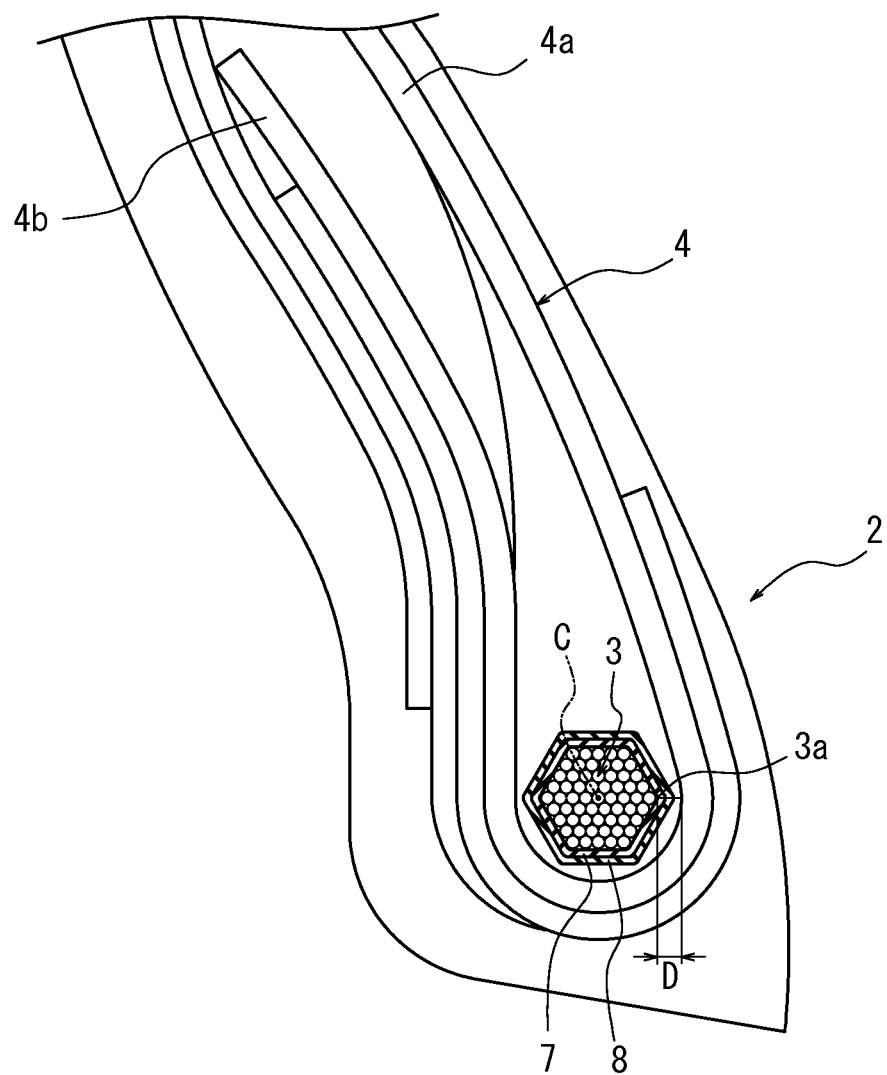
FIG. 2 is an enlarged cross-sectional view in a tire width direction of the tire of FIG. 1, showing a major part of the tire.

For example, as illustrated in FIG. 2, which is an enlarged cross-sectional view, the bead core 3 can be formed by coiling one or more steel cord or the like in a tire width direction into a number of rows and repeatedly coiling the cord in a tire radial direction into a number of columns in order to form the bead core 3 into a polygon (a hexagon in FIG. 2) in a section in a tire width direction.

In a tire having a polygonal bead core 3 in the section in the tire width direction, for example, when the tire mounted onto a rim (which is not illustrated) is inflated to a much higher air pressure than predetermined and prescribed air pressure or when large load beyond prescription is applied to the tire, during the tire 1 rotating and being loaded, tension of the carcass ply 4 in such a direction that folded portion 4b of the carcass ply 4, which is outwardly folded around the bead core 3 in a tire width direction, is drawn back. And thus body 4a of the carcass ply is repeatedly pressed to a corner 3a of the bead core 3 on the side of the body 4a by large force to concentrate stress into the carcass ply 4. As a result, durability of the carcass ply 4 could be reduced. In order to address the problem, in the present invention, at least two reinforcement layers 7, 8 with organic fiber are provided over the bead core 3 as illustrated in FIG. 2.

In FIG. 2, each of two reinforcement layers 7, 8 with organic fiber is formed by spirally coiling one or more rubber-coated organic fiber cord over the bead core 3 such that the cord is tilted to the center line C of the bead core in a transverse section. The cord does not overlap in a tire circumferential direction and space at least partly in the tire circumferential direction is provided. In addition, each of organic fiber cord in adjacent inner reinforcement layer 7 with organic fiber and adjacent outer reinforcement layer 8 with organic fiber extends in such a direction that the organic fiber cord in the inner reinforcement layer and the organic fiber cord in the outer reinforcement layer intersect each other relative to the center C line of the bead core 3 in the transverse section, According to the feature, even if the tire 1 is used under unexpectedly high internal pressure condition or unexpectedly high load condition, the distance D between the corner 3a of the bead core 3 and the body 4a of the carcass ply is sufficiently secured with two reinforcement layers 7, 8 with organic fiber, the layers coating entire circumferential surface of the bead core 3. In addition, since the two reinforcement layers 7, 8, in particular, coating rubber portion existing over entire circumferential surface of the bead core 3 works to effectively reduce press force repeatedly applied to the corner 3a of the bead core by the body 4a of the carcass ply, the stress concentration at the body 4a of the carcass ply by the corner 3a of the bead core is sufficiently reduced to certainly eliminate risk of degradation of durability of the carcass ply 4.

The organic fiber cords of the reinforcement layers 7, 8 with organic fiber may be made of, for example, nylon, rayon, polyester, aromatic polyamide or the like.

With respect to the above tire 1 including two or more reinforcement layers 7, 8 with organic fiber over the bead core 3, the distance D between the body 4a of the carcass ply 4 and the corner 3a of the bead core 3 on the side of the body 4a in the tire width direction is preferably equal to or more than 2 millimeters and equal to or less than 3 millimeters in order for the reinforcement layers 7, 8 with organic fiber to effectively exert function to reduce the stress concentration at the carcass ply 4, in order to prevent drawing back of the carcass ply 4 from the bead portion 2, and in order to inhibit increase of heat generation in the bead portion 2.

In the section in the tire width direction, the ratio of the length of the bead core 3 in a tire width direction to the length of the bead core in the tire radial direction is preferably in the range between 0.8 and 1.2, the illustrated bead core 3 having a hexagonal shape in the section in the tire width direction.

Figure 3:
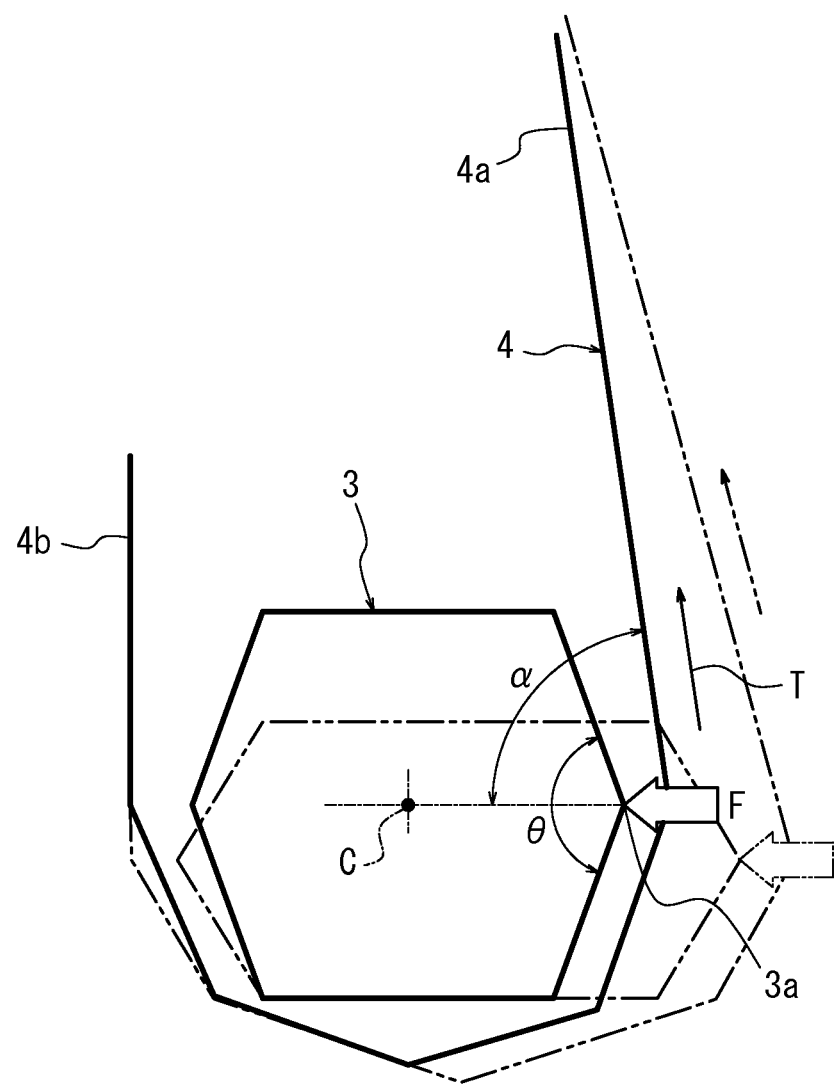
FIG. 3 is a schematic view showing a carcass line in a bead portion.

In this case, as illustrated in FIG. 3, which is a schematic view, an open angle of the corner 3a of the bead core 3 on the side of the body 4a of the carcass ply i.e. an inner angle θ at the corner 3a of the bead core 3, which has a hexagonal shape, becomes higher than that of a conventional bead core illustrated with an imaginary line to further reduce the stress concentration to the body 4a of the carcass ply pressed by the corner 3a. In addition, since an elevation acute angle α of carcass line of the body 4a of the carcass ply, in the section in a tire width direction, the carcass line existing outside the center of the bead core 3 in a tire radial direction, with respect to the tire width direction becomes higher that of a conventional carcass ply, reactive press force F applied from the corner 3a of the bead core to the body 4a of the carcass ply caused by acting tension T on the carcass ply 4 may be reduced, the tension T extending in the direction of the arrow in FIG. 3. Accordingly, degradation of durability of the carcass ply 4 may be more effectively prevented.

It is noted that the elevation angle α of the carcass line is in the range between 60 degrees and 70 degrees, for example.

It is noted that the inner angle θ of the corner 3a of the bead core 3 can be measured as follows. A tire is inflated to a predetermined internal pressure and is under unloaded condition. In the illustrated section in the tire width direction, the center of the innermost cord of the bead core 3 in the tire width direction (i.e. the cord which is located the most inwardly of cords in the tire width direction) and the center of the cord located the most inwardly of cords in the tire width direction, the cords forming an outer surface of the bead core 3 in the tire radial direction, are connected with a straight line. The center of the innermost cord in the tire width direction and the center of the cord located the most inwardly of cords in the tire width direction, the cords forming an inner surface of the bead core 3 in the tire radial direction, are connected with a straight line. Then, the angle between the two straight lines is measured.

The elevation angle α of the carcass line can be measured as follows. A tire is inflated to a predetermined internal pressure and is under unloaded condition. In the illustrated section in the tire width direction, two straight lines parallel to the tire width direction through the center C of the bead core 3 and the outermost point of the bead core 3 in the tire radial direction respectively are drawn. Two intersection points of each of the two straight lines with the body 4a of the carcass ply are connected with a straight line. Then, the acute angle of the straight line with respect to the tire width direction is measured.

It is noted that although the above bead core 3 has a hexagonal shape in a section in the tire width direction, the bead core may have a polygonal shape having one or more corner on the side of the body 4a of the carcass ply 4 in the section. For example, although not illustrated, the bead core may have a tetragonal shape or the like.

The drawing illustrates a single carcass ply 4 and the carcass ply may be formed by extending steel cord, organic cord or the like in a radial direction. Although not illustrated, two or more carcass ply may be provided.

For example, in the drawings, the belt 5 is composed of two belt layers made by extending steel cord or the like such that the cord or the like is tilted at between 20 degrees and 60 degrees to the equatorial plane of the tire. In the embodiment, each cord of the two belt layers extends in opposite direction each other with respect to a tread circumferential direction.

With respect to manufacturing the above tire, for example, two or more reinforcement layers with organic fiber over annular material for the bead core made by coiling rubber-coated steel cord are formed as follows. Firstly, as illustrated in FIG. 4(*a*), a first reinforcement layer (an inner reinforcement layer) 22 with organic fiber is formed by spirally extending a ribbon-shaped strip 21, which is made by coating organic cord with unvulcanized rubber, such that the strip 21 is tilted to the center line of the material 20 for the bead core in a transverse section and the strip 21 is coiled along entire center line of the material 20 for the bead core in a transverse section.

If the strip 21 is coiled such that adjacent portions 21*a*, 21*b* of the strip 21 in a circumferential direction of the material 20 for the annular bead core are overlapped each other, an organic fiber cord in the portion 21*a* of the strip and an organic fiber cord in the portion 21*b* of the strip could extend parallel to each other and overlap at an area where portions 21*a*, 21*b* of the strip 21 are overlapped. The overlapping of the organic fiber cords over the material for the bead core leads to deterioration of surface condition of the material 22 for the reinforcement layer. In the embodiment, as illustrated in FIG. 4(*a*), the strip 21 is coiled such that the adjacent portions 21*a*, 21*b* of the strip do not overlap with each other to provide space S in at least part. For example, the gap I1O between the adjacent portions on the outer side in the tire radial direction satisfy the relationship:

$$0 \text{ millimeters} < I_{1O} \leq 11 \text{ millimeters}.$$

Preferably, the gap I1I on the inner side in the tire radial direction satisfy the relationship:

0 millimeters<$I_{1I}$≤10 millimeters.

According to the feature, the overlapping of the organic fiber cord included in the inner reinforcement layer with organic fiber may be prevented to prevent local and large force applied from the bead core to the carcass ply.

In addition, when a second or the rest the reinforcement layers (an outer layer) described below is formed, surface condition of material for the outermost reinforcement layer may be sufficiently appropriate by coiling the strip such that the adjacent portions of the strip do not overlap with each other to prevent the parallel overlapping of the cord in each of the material for the reinforcement layer. As a result, an impact from the surface condition of the material for the outermost reinforcement layer on the material for the carcass ply and the like arranged around the material for the outermost reinforcement layer may be sufficiently small. The gap $I_{1O}$ may be, for example, greater than or equal to 1 millimeter or greater than or equal to 2 millimeters.

It is noted that in the specification, the gaps $I_{1O}$, $I_{1I}$ of the space S of the material for the inner reinforcement layer and the gaps $I_{2O}$, $I_{2I}$ of the space S of the material for the outer reinforcement layer (the second reinforcement layer or the rest of the reinforcement layer) described below represents mean values of gaps of the spaces across all circumference in the tire circumferential direction.

Then, as illustrated in FIG. 4(b), a ribbon-shaped strip 23 is spirally coiled over the material 22 for the first reinforcement layer to form material 24 for a second reinforcement layer.

When the material 24 for the second reinforcement layer is formed, the strip 23 extends on the outer side of the gap S of the material 22 for the first reinforcement layer such that the strip 23 covers the gap S as much as possible, preferably completely, the space S formed between adjacent portions 21a, 21b in the circumferential direction of the material 20 for the annular bead core by coiling the strip 21 such that the adjacent portions 21a, 21b of the strip do not overlap with each other during forming the first reinforcement layer. As a result, thickness of rubber layer may be secured over entire circumferential surface of the bead core.

Figure 5:
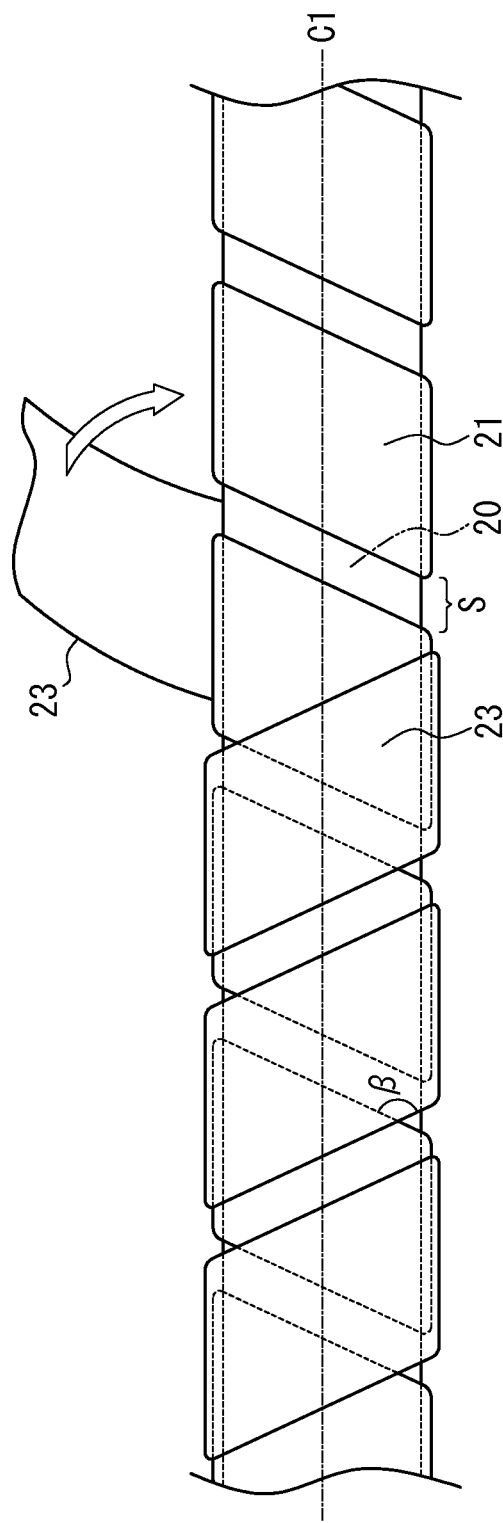
FIG. 5 is an enlarged partial plan view of the material for the bead core over which a strip is coiled, showing an aspect of coiling of a strip of a second layer over the material for the bead core.
Figure 7:
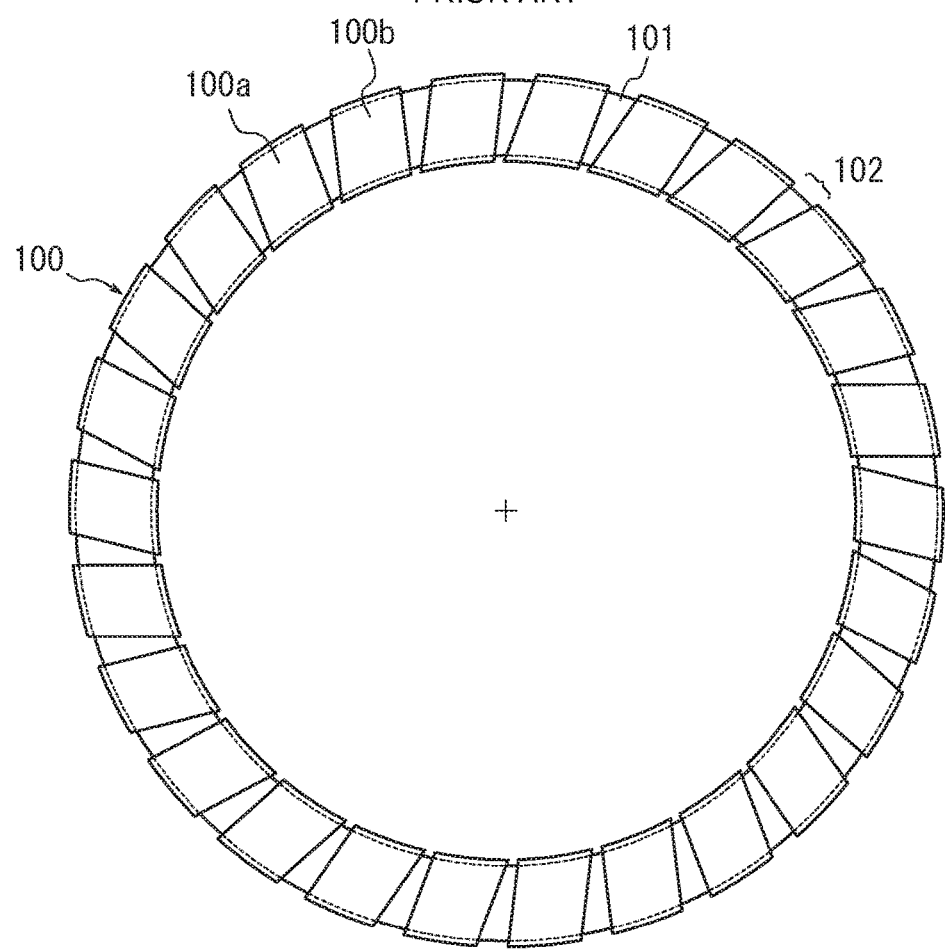
FIG. 7 is a side view of material for a bead core over which a strip is coiled, showing a part of manufacturing process of a conventional tire.

The strip 23 of which the second reinforcement layer is formed is coiled such that the strip 23 and the strip 21 of the first reinforcement layer intersect as illustrated in FIG. 5, which is an enlarged plan view, in order to prevent parallel overlapping of an organic fiber cord in the first reinforcement layer 22 and an organic fiber cord in the second reinforcement layer 24.

When the material 24 for the second reinforcement layer is formed, for example, the ribbon-shaped strip 23 is coiled such that the gap $I_{2I}$ on the inner side in the tire radial direction is preferably satisfies the relationship 0 millimeters<$I_{2I}$≤10 millimeters in light of preventing overlapping of organic fiber cord in a reinforcement layer close to the carcass ply to prevent local large force applied from the bead core to the carcass ply. More preferably, the relationship 0 millimeters<$I_{2I}$≤5 millimeters is satisfied.

In addition, although not illustrated, a third reinforcement layer or the rest of reinforcement layers may be formed as follows. A strip of the outer reinforcement layer is similarly coiled such that the strip in the outer reinforcement layer and a strip in the inner layer inwardly adjacent to the outer reinforcement layer intersect on the outer circumferential side of the inner reinforcement layer. Preferably, the strip of the outer reinforcement layer is coiled with gaps $I_{2O}$, $I_{2I}$.

The ribbon-shaped strips 21, 23 used for forming reinforcement layers 22, 24 may be between 20 millimeters and 30 millimeters in width and may be approximately 1 millimeter in thickness. The strip like this may be formed, for example, by conducting dip-coating process for one organic fiber or a plurality of lined organic fiber cords and sandwiching the cord between two layers of thin unvulcanized rubber sheets, which are provided from above and under respectively, to coat the cord with rubber.

As illustrated in FIG. 5, an intersecting angle f3 between a direction in which the strip 21 in the inner reinforcement layer extends and a direction in which the strip 23 on the outer circumferential side extends, the directions sandwiching the center line C1 of the material 20 for the bead core in the transverse section, is preferably between 70 degrees and 130 degrees in light of more securely preventing parallel overlapping of a cord in the inner layer and a cord in the outer layer and facilitating coiling of a strip over the material 20 for the bead core. The inner and outer layers are tilted at equal and opposite angles with respect to the bead core center.

When a strip 23 separate to that of the material 22 for the inner reinforcement layer is used to form the material 24 for the outer reinforcement layer, coiling of the strip 23 of the outer layer in the circumferential direction of the material 20 for the annular bead core may be started at exactly the opposite position to the position where coiling of the strip 21 of the inner layer is started. In other words, coiling of the strip 23 of the outer layer may be started at the position which is 180 degrees around the central axis of the material 20 for the annular bead core and opposite from the position where coiling of the strip 21 of the inner layer is started. However, material for the outer reinforcement layer 24 may be formed by other methods.

A pneumatic tire using the material 20 for the bead core, over which two or more materials 22, 24 for reinforcement layers are formed as above, is manufactured as follows, for example. Although not illustrated, the material 20 for the bead core and other component depending on need are provided on the outer circumferential side of the cylindrical carcass band, which is formed on a molding drum, the material 20 for the bead core having a pair of materials 22, 24 for the reinforcement layers. Both ends of the carcass band are folded around the material 20 for the bead core during a body of the carcass band expanding and deforming. Material for a belt and material for tread rubber and the like are attached to the expanded and deformed portion of the carcass band to form a greentire. Then, the greentire is vulcanized.

In the tire manufactured as above, when the tire is vulcanized, rubber of two or more reinforcement layers with organic fiber flows. And thus, the two or more reinforcement layers with organic fiber coat entire circumferential surface of the bead core with sufficiently thick rubber. As a result, degradation of durability of the carcass ply may be effectively prevented caused by the body of the carcass ply being pressed from the corner of the bead core.

EXAMPLES

Pneumatic tires according to the present invention were prototyped to evaluate performance as follows.

Example Tires of size 11.00R20 and 12.00R20, and Conventional Tires of size 11.00R20 and 12.00R20 were produced.

Example Tire 1 of size 12.00R20 had a similar feature to a tire 1 illustrated in FIGS. 1 and 2. Two reinforcement layers with organic fiber were formed over a bead core of the tire. The organic fiber cord of the reinforcement layer with organic fiber was made of nylon. An intersecting angle between a cord in the inner reinforcement layer and a cord in the outer reinforcement layer was 100 degrees.

As illustrated in FIG. 6(a), the bead core of the Example Tire 1 was formed by repeatedly coiling a cord to form nine columns. Numbers of rows in each column from the innermost column to the outermost column in a tire radial direction were increased and decreased and were 6, 7, 8, 9, 10, 9, 8, 7 and 6, respectively. The ratio of length of the bead core in a tire radial direction to length of the bead core in a tire width direction was 1:1.5.

It is noted that in the Example Tire 1, the distance between a body of the carcass ply and a corner of the bead core in the tire width direction was 2.2 millimeters, and an elevation angle of a carcass line was 65 degrees.

Referring to FIG. 4, in the Example Tire 1, both gaps $I_{1O}$, $I_{2O}$ of spaces S of the material for the inner reinforcement layer and the material for the outer reinforcement layer on the outer side in the tire radial direction were 3 millimeters. Both gaps $I_{1I}$, $I_{2I}$ on the inner side in the tire radial direction were 2 millimeters.

Example Tire 2 had a similar feature to the Example Tire 1 except both gaps $I_{1O}$, $I_{2O}$ of spaces S of the material for the inner reinforcement layer and the material for the outer reinforcement layer on the outer side in the tire radial direction were 6 millimeters and both gaps $I_{1I}$, $I_{2I}$ on the inner side in the tire radial direction were 5 millimeters. Example Tire 3 had a similar feature to the Example Tire 1 except both gaps $I_{1O}$, $I_{2O}$ of spaces S of the material for the inner reinforcement layer and the material for the outer reinforcement layer on the outer side in the tire radial direction were 11 millimeters and both gaps $I_{1I}$, $I_{2I}$ on the inner side in the tire radial direction were 10 millimeters.

Example Tire 4 were produced by changing the distance between the body of the carcass ply and the corner of the bead core in a tire width direction of the Example Tires 1 to 1.9 millimeters and changing elevation angle of the carcass line of the Example Tires 1 to 66 degrees. Example Tire 5 were produced by changing the distance between the body of the carcass ply and the corner of the bead core in a tire width direction of the Example Tires 1 to 3.3 millimeters and changing elevation angle of the carcass line of the Example Tires 1 to 63 degrees. In addition, Example Tire 5 had three reinforcement layers with organic fiber. It is noted that the third reinforcement layer had the same feature as that of the second reinforcement layer except for directions in which organic fiber extends.

Example Tire 6 had a similar feature to the Example Tire 1 except size of the Example Tire 6 was 11.00R20 and as illustrated in FIG. 6(b), numbers of rows in each column of a formed bead core from the innermost column to the outermost column in a tire radial direction were increased and decreased and were 5, 6, 7, 8, 9, 8, 7, 6 and 5, respectively, the ratio of length of the bead core in a tire radial direction to length of the bead core in a tire width direction was 1:1, and elevation angle of the carcass line was 70 degrees.

In Example Tire 7, the ratio of length of the bead core in a tire radial direction to length of the bead core in a tire width direction was 1:0.7, and elevation angle of the carcass line was 75 degrees.

Example Tire 8 was produced by changing both gaps $T_{1O}$, $I_{2O}$ of spaces S of the material for the inner reinforcement layer and the material for the outer reinforcement layer on the outer side in the tire radial direction of the Example Tire 7 to 11 millimeters and both gaps $I_{1I}$, $I_{2I}$ on the inner side in the tire radial direction of the Example Tire 7 to 10 millimeters.

Conventional Tire 1 had similar feature to the Example Tire 1 except Conventional Tire 1 had a single reinforcement layer with organic fiber, the distance between the body of the carcass ply and the corner of the bead core in a tire width direction was 1.1 millimeters and elevation angle of the carcass line was 68 degrees.

Conventional Tire 2 had similar feature to the Conventional Tire 1 except size of the Conventional Tire 2 was 11.00R20, and as illustrated in FIG. 6(c), numbers of rows in each column of a formed bead core from the innermost column to the outermost column in a tire radial direction were increased and decreased and were 7, 8, 9, 10, 9, 8 and 7, respectively, the ratio of length of the bead core in a tire radial direction to length of the bead core in a tire width direction was 1:2, and elevation angle of the carcass line was 60 degrees.

Inner liners of the Example Tires and Conventional Tires were peeled away. The Example Tires and Conventional Tires were inflated with Oxygen and were left in constant temperature storage for a month. Then, residual force of the ply was measured in conformity with JIS Z 2241.

Table 1 shows the result as well as specifications of the Example Tires and Conventional Tires. The residual force of the ply in the Table 1 represents index on the basis of Conventional Tire 2. A higher index indicates smaller degradation of durability of the carcass ply.

TABLE 1

| | Number of reinforcement layers with organic fiber | Distance D between the bead core and the carcass ply (mm) | Elevation angle of the carcass line (degree) | Ratio of length of the bead core in the tire radial direction to that in the tire width direction | Gaps $I_{1O}$, $I_{2O}$ of the space S of the material for the reinforcement layer on the outer side in the tire radial direction (mm) | Gaps $I_{1I}$, $I_{2I}$ of the space S of the material for the reinforcement layer on the inner side in the tire radial direction (mm) | Residual force of the ply |
|---|---|---|---|---|---|---|---|
| Conventional Tire 1 | 1 | 1.1 | 68 | 1:1.5 | 3 | 2 | 110 |
| Conventional Tire 2 | 1 | 1.1 | 60 | 1:2 | 3 | 2 | 100 |
| Example Tire 1 | 2 | 2.2 | 65 | 1:1.5 | 3 | 2 | 140 |
| Example Tire 2 | 2 | 2.2 | 65 | 1:1.5 | 6 | 5 | 133 |
| Example Tire 3 | 2 | 2.2 | 65 | 1:1.5 | 11 | 10 | 125 |
| Example Tire 4 | 2 | 1.9 | 66 | 1:1.5 | 3 | 2 | 130 |
| Example Tire 5 | 3 | 3.3 | 63 | 1:1.5 | 3 | 2 | 130 |
| Example Tire 6 | 2 | 2.2 | 70 | 1:1 | 3 | 2 | 160 |
| Example Tire 7 | 2 | 2.2 | 75 | 1:0.7 | 3 | 2 | 170 |
| Example Tire 8 | 2 | 2.2 | 75 | 1:0.7 | 11 | 10 | 150 |

Table 1 demonstrates that the Example Tires 1-8 have larger residual force of the ply than Conventional tires. Therefore, a pneumatic tire according to the present invention may prevent degradation of durability of a carcass ply. The Example Tires 1-8 comprises two or more laminated reinforcement layers with organic fiber over the bead core, in which an organic fiber cord in the inner reinforcement layer with organic fiber and an organic fiber cord in the outer reinforcement layer with organic fiber intersect each other relative to the center line of the bead core in the transverse section, in which in the inner reinforcement layer with organic fiber of the adjacent reinforcement layers with organic fiber, the rubber-coated organic fiber cord is coiled with space at least partially in a tire circumferential direction such that the rubber-coated organic fiber cord does not overlap in the tire circumferential direction, and the outer reinforcement layer with organic fiber is arranged to cover at least a part of the space. On the other hand, all of the Conventional Tires have one reinforcement layer with organic fiber.

REFERENCE SIGNS LIST

1: Pneumatic tire
2: Bead portion
3: Bead core
4: Carcass ply
4a: Body
4b: Folded portion
5: Belt
6: Tread rubber
7, 8: Reinforcement layer with organic fiber
20: Material for the bead core
21, 23: Ribbon-shaped strip
21a, 21b: Portion of the strip
22, 24: Material for the reinforcement layer
C: Center line of the bead core in a transverse section
C1: Center line of the material for the bead core in a transverse section
D: Distance between the body of the carcass ply and the corner of the bead core in a tire width direction
θ: Inner angle of the corner of the bead core
α: Elevation angle of a carcass line
β: Intersecting angle between a direction of the inner layer and a direction of the outer layer
T: Tension on the carcass ply
F: Reactive press force applied to the body of the carcass ply
S: Space
$I_{1O}, I_{1I}, I_{2O}, I_{2I}$: Gap

The invention claimed is:

1. A pneumatic tire comprising:
a pair of annular bead cores embedded and arranged in bead portions;
a carcass formed of at least one carcass ply including a body and a pair of folded portions connected to the body, the body toroidally extending between the pair of the bead cores, each folded portion folded around the respective bead core;
a tread rubber arranged on the outer side of the periphery of a crown region of the carcass; and
at least two laminated reinforcement layers over the respective bead core, and in each layer, at least one rubber-coated organic fiber cord is tilted to the center line of the bead core in a transverse section and is spirally coiled,
wherein in a cross section in a tire width direction, the bead core has a polygonal shape and includes at least one corner on the side of the body of the at least one carcass ply,
wherein each organic fiber cord in an inner adjacent reinforcement layer and in an outer adjacent reinforcement layer over the bead core extends such that organic fiber cord coils in the inner reinforcement layer and organic fiber cord coils in the outer reinforcement layer intersect each other relative to the center line of the bead core in the transverse section, and
wherein in the inner reinforcement layer of the adjacent reinforcement layers, the at least one rubber-coated organic fiber cord is coiled in all turns with space in a tire circumferential direction such that in all of the turns the at least one rubber-coated organic fiber cord does not overlap in the tire circumferential direction, and the outer reinforcement layer is arranged to cover at least a part of the space such that the at least one rubber-coated organic fiber cord does not overlap in the tire circumferential direction;
wherein the gap $I_{1I}$ between adjacent portions on the inner side in the tire radial direction of the inner reinforcement layer is greater than or equal to 1 millimeter.

2. The pneumatic tire of claim 1, wherein the distance between the body of the carcass ply and the corner of the bead core on the side of the body in the tire width direction is equal to or more than 2 millimeters and equal to or less than 3 millimeters.

3. The pneumatic tire of claim 1, wherein in the section in the tire width direction, the ratio of the length of the bead core in a tire radial direction to the length of the bead core in the tire width direction is between 1:0.8 and 1:1.2.

4. The pneumatic tire of claim 1, wherein the elevation angle of the carcass line is in the range between 60 degrees and 70 degrees.

5. The pneumatic tire of claim 1, wherein the bead core has a hexagonal shape in a section in the tire width direction.

6. The pneumatic tire of claim 1, wherein the bead core has a tetragonal shape in a section in the tire width direction.

7. The pneumatic tire of claim 1, further comprising a belt arranged on the outer side of the periphery of the crown region of the carcass, the belt being composed of two layers made by extending the steel cord tilted between 20 degrees and 60 degrees to an equatorial plane of the tire, wherein the tread rubber is arranged on the outer side of the periphery of the belt.

8. The pneumatic tire of claim 1, wherein the gap $I_{1O}$ between adjacent portions on the outer side in the tire radial direction of the inner reinforcement layer is greater than the gap $I_{1I}$ between the adjacent portions on the inner side in the tire radial direction of the inner reinforcement layer and is less than or equal to 11 millimeters.

9. The pneumatic tire of claim 1, wherein the gap $I_{1I}$ between the adjacent portions on the inner side in the tire radial direction of the inner reinforcement layer satisfies the relationship:

$$2 \text{ millimeters} < I_{1I} \leq 10 \text{ millimeters}.$$

10. The pneumatic tire of claim 1, wherein in each laminated reinforcement layer, the at least one rubber-coated organic fiber cord is provided in the form of a ribbon-shaped strip between 20 millimeters and 30 millimeters in width, the strip extending in the longitudinal direction of the at least one organic fiber cord.

11. The pneumatic tire of claim 10, wherein an intersecting angle between a direction in which the strip in the inner reinforcement layer extends and a direction in which the strip in the outer reinforcement layer extends, the directions sandwiching the center line of the bead core in the bead core transverse section, is between 70 degrees and 130 degrees.

12. A method for manufacturing the pneumatic tire according to claim 1, the method comprising:
   forming each of the at least two laminated reinforcement layers by providing in each layer a ribbon-shaped strip, which is made by coating the at least one organic fiber cord with unvulcanized rubber;
   forming the inner reinforcement layer by arranging one said ribbon-shaped strip over the bead core such that the one ribbon-shaped strip is tilted to the center line of the bead core in a transverse section;
   spirally coiling the one ribbon-shaped strip such that adjacent portions of the strip do not overlap with each other in a circumferential direction of the bead core;
   forming the outer reinforcement layer by spirally coiling another said ribbon-shaped strip over the inner reinforcement layer and over space between the adjacent portions of the strip of the inner reinforcement layer such that the strip of the outer reinforcement layer intersects with the strip of the inner reinforcement layer; and
   providing the at least two laminated reinforcement layers, the pair of annular bead cores, the carcass, and the tread rubber to form the pneumatic tire.

\* \* \* \* \*